United States Patent [19]

Chitil

[11] Patent Number: 4,555,267

[45] Date of Patent: Nov. 26, 1985

[54] PROCESS FOR MAKING FUEL FROM SOLID METALLIC IRON-BEARING MATERIALS

[75] Inventor: Manfred Chitil, Krefeld-Bockum, Fed. Rep. of Germany

[73] Assignee: Klöckner CRA Technologie GmbH, Duisburg, Fed. Rep. of Germany

[21] Appl. No.: 498,045

[22] Filed: May 25, 1983

[30] Foreign Application Priority Data

Jul. 16, 1982 [DE] Fed. Rep. of Germany ....... 3226590

[51] Int. Cl.⁴ .............................................. C21C 7/00
[52] U.S. Cl. ...................................................... 75/46
[58] Field of Search ....................................... 75/46, 60

[56] References Cited

U.S. PATENT DOCUMENTS 3,772,000 11/1973 Hyde et al. .............................. 75/60
3,791,819 2/1974 Loutzenhiser .......................... 75/46

Primary Examiner—Peter D. Rosenberg
Attorney, Agent, or Firm—Watson, Cole, Grindle & Watson

[57] ABSTRACT

In the process for making steel from scrap, in each converter cycle following the charging of scrap, an amount of hot metal charge originating from a preceding converter cycle is charged over the scrap. The total charge is melted down through the introduction of fuel and oxygen via sub bath or submerged inlet tuyeres. The molten tap is tapped either into two storage vessels, in repetition cycles, and used as a hot metal charge during two subsequent charges, or the tap is added for subsequent processing, in production cycles, particularly for a casting operation wherein finish-refining is effected prior to the tapping.

7 Claims, 1 Drawing Figure

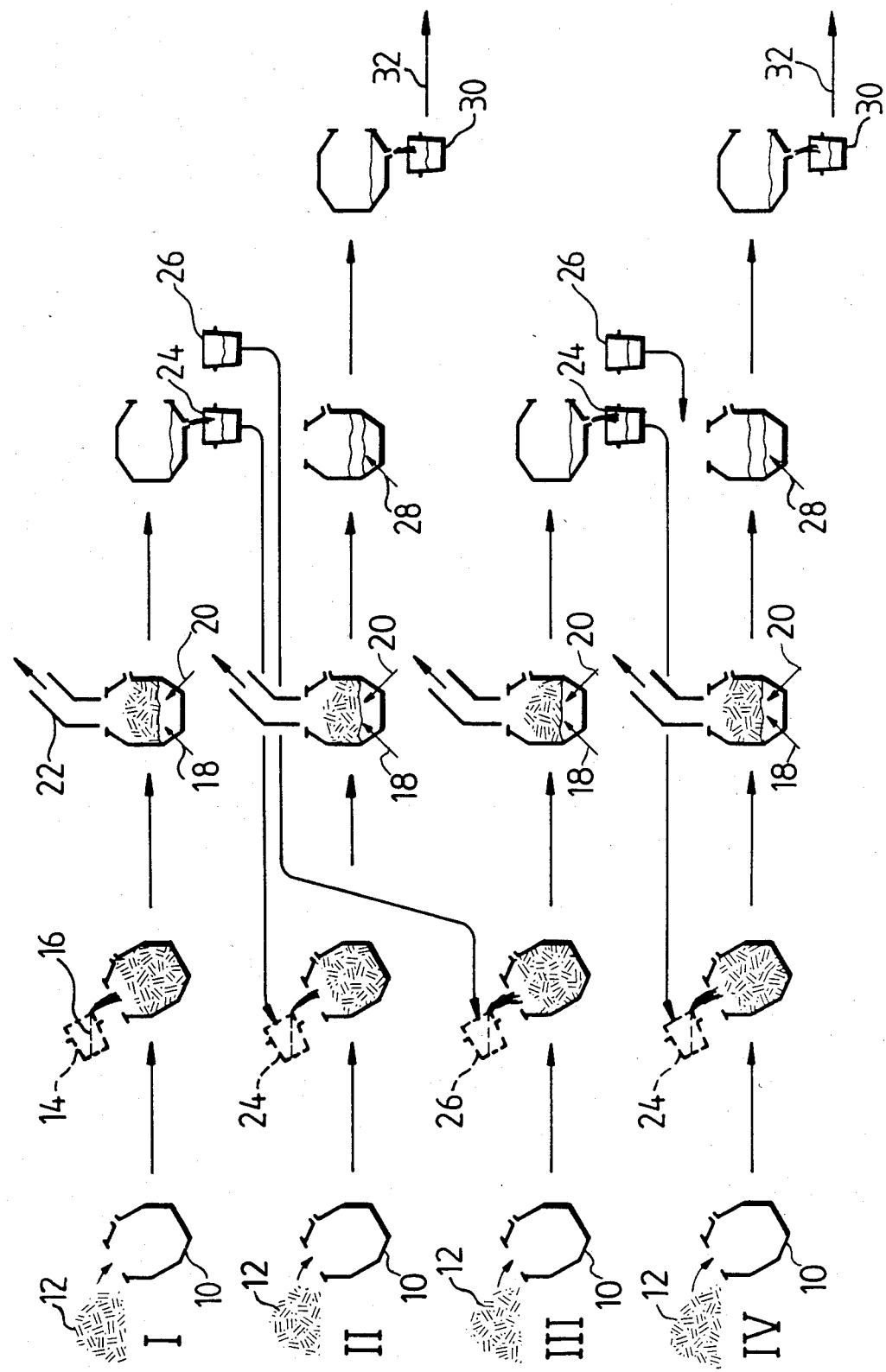

PROCESS FOR MAKING FUEL FROM SOLID METALLIC IRON-BEARING MATERIALS

BACKGROUND OF THE INVENTION

1. Field of the Invention

This invention relates to a process for making steel from solid metallic iron-bearing materials in a converter equipped with sub bath or submerged inlet tuyeres for supplying carbonaceous fuel and oxygen to the converter. In each converter cycle a quantity of solid iron-bearing material is loaded into the converter, and a quantity of molten iron-bearing material is then poured over the solid iron-bearing material. The molten iron-bearing hot metal charge originates from a preceding converter cycle. The total charge is melted down through the introduction of fuel and oxygen, and a portion of the hot metal charge is tapped into a storage vessel for a subsequent converter cycle.

2. Description of the Prior Art

A process for making steel from solid metallic iron-bearing materials is known from West German Unexamined Patent Application 29 39 859. In each converter cycle a portion, and preferably the major portion of the drawn off molten metal tap is delivered for subsequent processing, for example, to a continuous casting plant, while the remainder of the tap is stored separately and is used as a hot steel charge in a subsequent converter cycle wherein it is added to a charge of iron-bearing materials. Hence, this prior art steelmaking process involves a quasi continuous operation wherein a quantity of liquid pig iron or crude steel is required at the beginning of a series of converter cycles. In subsequent converter cycles the amount of liquid iron or steel used comes from the preceding converter cycle.

Therefore, in this known steelmaking process, steel can be produced from solid iron-bearing materials without requiring liquid pig iron and with greater energy efficiency in a relatively short tap-to-tap time and, hence, in a more economical fashion. The process is not limited to a pig iron production facility and enables steel to be made solely from solid iron-bearing materials, particularly scrap metal.

However, when practicing this known method, it has been found that in existing converters and with charges of pure scrap the full charge weight of the converter cannot always be attained because the required amount of scrap needed to reach the full charge weight cannot be introduced into the converter. As a rule, the scrap is so bulky that during charging, the converter becomes filled up before the desired amount of scrap, expressed as a weight, is reached. In other words, the charging of the scrap is limited by the volume of the converter, so that the full charge weight of the converter is not attained and the converter is not fully exploited.

It would be possible to introduce at first into the converter only some of the scrap that is to be melted in a converter cycle and charge the remainder later, e.g., in the form of scrap for cooling. However, the sequence of production steps would be interrupted by the subsequent post-charging, because the converter has to be tilted in the charging position.

Alternatively, converters could be utilized with a larger internal volume, that is, with a larger converter volume. Usually, the converter volume is defined by the available internal volume per ton of steel and is less than 1, typically 0.8, in most converters. However, there are also converters that have still smaller converter volumes. Since the scrap material, due to its bulkiness caused by a large percentage of included air gaps, has a specific weight of approximately 1, then one must realize that especially with a desired and more economical smaller repeat quantity of molten tap of, 20% to 50% of the total weight of the charge, the amount of scrap needed for the charging cannot be introduced into the converter. One must also bear in mind that the converter is typically filled in a tilting position, so that only 80% of the internal volume of the converter can be fully exploited. In a converter with a larger converter volume, for example, greater than 1, this problem does not arise. However, this type of larger converter, because of its larger internal surface, is less economical, since it leads to higher costs for refractory material. Furthermore, increasing the volume of the converter is no solution for adapting existing converters to the prior art process.

Another drawback of the prior art process is the fact that in each converter cycle one must finish-refine the tap because a portion of the tap, that is, a repeat portion, is always supplied for the subsequent processing. That is to say, the tap must have a desired steel quality and particularly a certain carbon content. According to the prior art process, the liquid tap is delivered to a storage vessel, such as a steel ladle. The amount of the repeat portion of steel tap provided for the repeat or reuse process cycle is carburized, preferably in the storage vessel. However, the carburization can also take place in the converter after the tapping of the amount of steel intended for the subsequent processing, but this prolongs the cycle time. As is well known, carburization causes the liquidus point to be lowered and thus no heat need be supplied to the storage vessel if there is a short time period until the next converter cycle.

SUMMARY OF THE INVENTION

It is an object of the invention to overcome the drawbacks of the prior steelmaking process operating with a repeat or reuse cycle but without sacrificing its advantages, particularly with respect to a steelmaking process that uses scrap material almost exclusively, and to improve this process in such a way that the weight of the charge for which the converter has been designed can be fully maintained and exploited while using a converter with a limited converter volume.

This object is achieved by filling the converter at the beginning of each converter cycle with an agglomerate of scrap metal, alternately providing a molten tap from at least one converter cycle (production cycle) for subsequent processing, e.g., for a casting operation, and providing the major portion of a tap from at least one subsequent converter cycle (repeating cycle) for at least two storage vessels, each of which receives the quantity of hot metal charge for at least two additional subsequent converter cycles.

Thus, unlike the prior steelmaking process, production cycles and repeating cycles are alternated, alternately one production cycle and one repeating cycle, etc. In the production cycles the steel is finish-refined. In the repeating cycles it is not necessary to adhere to a certain steel quality. That is, the finish-refining of the production cycle can be dispensed with in the repeating cycles. It is desirable to attain the total weight of the charge for which the converter has been designed in each individual converter cycle.

Furthermore, unlike the process known from the prior art, the invention provides for tapping into at least two storage vessels. The number of storage vessels into which tapping is effected is one greater than that of the successive production cycles, so that there is always an amount of repeat or reuse steel remaining for the next repeating cycle.

The operation of the steelmaking process according to the invention is intermittent or periodic as in the prior art process, but an operating period does not include or consist of only one converter cycle, but of at least two converter cycles, that is to say, one repetition cycle and one production cycle forms an operating period in the present process. An operating period may also include or consist of two repetition cycles and one production cycle, or one repetition cycle and two production cycles, etc. The number of individual cycles depends particularly on the volume of the converter, the required amount of hot metal repeat charge in relation to the overall charge and, to a certain extent, on the specific weight, for example, the bulkiness of the scrap employed. One aims at minimizing the portion of the hot metal charge relative to the overall charge because this results in higher net steel production.

According to the teachings of the invention, the agglomerate of scrap charged into the converter prior to the addition of the hot metal charge is not, or at least only partially, preheated by means of fuel/oxygen burners. However, a mode of operation such as disclosed in the steelmaking process known from West German Unexamined Application No. 29 39 859 is not ruled out. According to the invention, the amount of preheating can be varied so as to achieve the most economical operation possible. Of decisive influence is the price of the fuel used for the preheating, e.g., the price of natural gas or petroleum, as well as the price of the carbonaceous fuel injected through the sub bath or submerged inlet tuyeres. Since the carbonaceous fuel is oxidized only into carbon monoxide and the coal gas escaping from the converter has an excellent calorific value and can be sold, a converter operation with only limited preheating is most economical if the price of petroleum or natural gas is high and the price of the carbonaceous fuel, such as coal, is lower in relation to providing the same amount of heat. The process of the invention enables one to adapt to the prevailing energy prices, because less preheating can be compensated for not only by adding more carbonaceous fuel to the liquid phase, but also by adding more hot metal charge.

BRIEF DESCRIPTION OF THE DRAWING

The process of the invention will be described below with reference to the sole accompanying drawing, which is a schematic representation of processing steps for four converter cycles.

DETAILED DESCRIPTION OF THE PREFERRED EMBODIMENT

In the drawing, the individual converter cycles are denoted by Roman numerals. In the first converter cycle I, a quantity 12 of 100 t scrap material is loaded into an empty converter 10 with, e.g., 200 t charge weight. Then, as shown in the second partial figure of cycle I, an amount of liquid iron or steel is charged as a hot metal charge 16 over the scrap 12. In the third partial figure of this converter cycle I, coal 18 and oxygen 20 are introduced in a known fashion through sub bath or submerged inlet tuyeres, and separated from one another in the liquid phase of the converter so that the amount of scrap material 12 melts down gradually, as shown in the third partial figure. The injected coal 18 is gasified into carbon monoxide, which is extracted through the discharge duct 22, where most of the sensible heat of the hot coal gas is also drawn out.

Finally, in the fourth partial figure of converter cycle I, the molten but not yet finish-refined pig iron is tapped into two auxiliary ladles 24 and 26, such that each auxiliary ladle receives 100 t pig iron. Consequently, converter cycle I is a reuse or repeat cycle.

In the next converter cycle II, a quantity 12 of 100 t weight scrap material is again charged into the emptied converter 10. As shown in the second partial figure of converter cycle II, the pig iron is introduced into converter 10 from auxiliary ladle 24. As shown in the third partial figure, this is followed by melting the scrap material with the injection of coal 18 and oxygen 20, as described earlier for converter cycle I. However, in contrast to converter cycle I and as shown in the fourth partial figure of converter cycle II, the melting of the scrap is followed by a finish-refining procedure. For this purpose, oxygen is injected at 28 in a known manner into converter 10. This is followed by other steps as known from the prior art in order to adjust the steel quality to suit the desired subsequent processing. In the fifth partial figure of converter cycle II, the steel obtained is tapped into a ladle 30 and, as indicated by arrow 32, delivered for a casting operation. Consequently, converter cycle II is a production cycle.

The contents of the second auxiliary ladle 26, which was also filled in the first converter cycle I, is now utilized in the next converter cycle III. For this purpose, as in the preceding cycles, an amount 12 of 100 t scrap material is charged or loaded into converter 10. As shown in the second partial figure, this is followed by the delivery of the contents of the second auxiliary ladle 26 to the agglomerate of preheated or non-preheated scrap. In this way, all of the pig iron produced in the first converter cycle has been utilized in the steelmaking process. Thus, like the currently described converter cycle III, converter cycle I is 100% a Repetier or repeat cycle. In the third partial figure of converter cycle III, the scrap is again melted down through the injection of coal 18 and oxygen 20 and, finally, as shown in the fourth partial figure, the liquid pig iron is tapped into the two auxiliary ladles 24 and 26.

The fourth converter cycle IV is again a production cycle which is exactly the same as the cycle II described above.

It is apparent from the drawing that two successive converter cycles, e.g., cycles II and III form an operating period which continues to be repeated during the steelmaking process.

Advantageously, the Repetier or repeating quantities of tapped molten tap stored in storage vessels, such as auxiliary ladles 24 and 26, are desulfurized in these vessels prior to being added as a hot metal charge to an amount of scrap in a subsequent converter cycle. Desulfurization may be carried out via processes known from the prior art.

Finally, it is preferable that the portion of the hot metal charge poured over the scrap material be maintained within a range of 20% to 50% of the total charge of the converter, and that the remaining portion of the total charge, to the extent permitted by the converter capacity, be composed of scrap.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for making steel from solid metallic iron-bearing materials during a plurality of alternating converter cycles including production cycles and repeat cycles using a converter having inlet tuyeres for providing a carbonaceous fuel and oxygen to said converter, a first storage vessel, and a second storage vessel, and wherein said process comprises:

preparing a molten metal charge during one of said converter cycles;

filling a quantity of said materials into said converter during each of said converter cycles;

pouring a portion of said metal charge over said materials filled in said converter to form a total charge during each of said converter cycles;

introducing said fuel and said oxygen into said converter for melting said total charge during each of said converter cycles;

melting said total charge in said converter to form a total tap during each of said converter cycles;

tapping a first portion of said total tap into said first storage vessel during each of said repeat cycles for use as a first metal charge in a first subsequent converter cycle;

tapping a second portion of said total tap into said second storage vessel during each of said repeat cycles for use as a second metal charge in a second subsequent converter cycle and wherein said first portion of said total tap and said second portion of said total tap together comprise a major portion of said total tap; and alternating said converter cycles such that a tap from at least one of said converter cycles is delivered to a subsequent processing operation.

2. The process according to claim 1 further using burner means and wherein said method further comprises partially preheating said materials in said converter prior to pouring said metal charge over said materials with said burner means.

3. The process according to claim 1 further using burner means and wherein said method further comprises avoiding preheating with said burner means of said materials in said converter prior to pouring said metal charge over said materials.

4. The process according to claim 1 which further comprises alternating said production cycles with said repetition cycles.

5. The process according to claim 1 which further comprises maintaining said portion of said metal charge poured over said materials within a range of 20% to 50% of said total charge, and wherein said materials further comprise the remaining portion of said total charge and are composed of scrap.

6. The process according to claim 1 which further comprises tapping said first portion and said second portion of said total tap of said repeat cycles without effecting a finish-refining operation.

7. The process according to claim 1 which further comprises desulfurizing said first portion and said second portion of said total tap in said first storage vessel and said second storage vessel, respectively, prior to use in said first subsequent converter cycle and said second subsequent converter cycle.

* * * * *